US006809629B2

(12) United States Patent
Heide et al.

(10) Patent No.: US 6,809,629 B2
(45) Date of Patent: Oct. 26, 2004

(54) ANTI-THEFT PROTECTION SYSTEM FOR A MOTOR VEHICLE, AND A METHOD FOR OPERATING AN ANTI-THEFT PROTECTION SYSTEM

(75) Inventors: Patric Heide, Neubiberg (DE); Johannes Ilg, Regensburg (DE); Richard Roskosch, Ottobrunn (DE); Klause Hofbeck, Neumarkt (DE); Wolfgang Piesch, Regenstauf (DE); Martin Vossiek, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 403 days.

(21) Appl. No.: 09/725,949

(22) Filed: Nov. 30, 2000

(65) Prior Publication Data

US 2001/0005170 A1 Jun. 28, 2001

(30) Foreign Application Priority Data

Nov. 30, 1999  (DE) .......................... 199 57 549

(51) Int. Cl.[7] .......................... G05B 19/00; G06F 7/04; G08B 29/00; H04B 1/00; B60R 25/00
(52) U.S. Cl. ..................... 340/5.61; 340/5.72
(58) Field of Search ............... 340/5.61, 5.63, 340/5.64, 5.65, 5.7, 5.72, 825.69, 825.72; 342/42, 457

(56) References Cited

U.S. PATENT DOCUMENTS

| 4,723,121 | A | | 2/1988 | van den Boom et al. ........... 340/825.31 |
| 5,001,486 | A | * | 3/1991 | Bachtiger .................... 342/42 |
| 5,051,741 | A | * | 9/1991 | Wesby .................... 340/825.49 |
| 5,649,295 | A | * | 7/1997 | Shober et al. ............. 340/10.1 |
| 5,917,449 | A | * | 6/1999 | Sanderford et al. ......... 342/457 |
| 5,956,259 | A | | 9/1999 | Hartsell, Jr. et al. .... 364/528.37 |
| 6,046,683 | A | * | 4/2000 | Pidwerbetsky et al. .... 340/10.4 |
| 6,064,320 | A | * | 5/2000 | d'Hont et al. ............. 340/933 |
| 6,107,910 | A | * | 8/2000 | Nysen ...................... 340/10.1 |
| 6,208,239 | B1 | * | 3/2001 | Muller et al. ............... 340/426 |
| 6,236,333 | B1 | | 5/2001 | King ..................... 340/825.31 |
| 6,259,991 | B1 | * | 7/2001 | Nysen ........................ 701/300 |
| 6,380,845 | B2 | * | 4/2002 | Tuttle ........................ 340/10.4 |
| 2002/0008615 | A1 | | 1/2002 | Heide et al. ................ 340/426 |

FOREIGN PATENT DOCUMENTS

| DE | 25 37 421 | 7/1976 | |
| DE | 38 38 657 | 5/1990 | |
| DE | 44 09 167 C1 | 6/1995 | ............ G07C/9/00 |
| DE | 198 25 702 A1 | 12/1999 | ............ G01S/7/03 |
| FR | 2 749 607 A1 | 12/1997 | ........... E05B/49/00 |
| GB | 21 79 751 | 3/1987 | |
| JP | 07 057 792 | 3/1995 | |
| JP | 09 312 190 | 12/1997 | |

* cited by examiner

*Primary Examiner*—Michael Horabik
*Assistant Examiner*—Nam V Nguyen
(74) *Attorney, Agent, or Firm*—Baker Botts L.L.P.

(57) ABSTRACT

Anti-theft protection system for a motor vehicle, and a method for operating an anti-theft protection system. The anti-theft protection system has a transmitting and receiving unit in the motor vehicle, which transmits radar signals and then waits for echo signals. A code transmitter, which receives a radar signal, modulates this signal and sends it back. An evaluation unit analyses all the received echo signals firstly for authorization of the code transmitter and secondly in order to determine the relative interior/exterior position of the code transmitter with respect to the motor vehicle.

15 Claims, 6 Drawing Sheets

ANTI-THEFT PROTECTION SYSTEM FOR A MOTOR VEHICLE, AND A METHOD FOR OPERATING AN ANTI-THEFT PROTECTION SYSTEM

CROSS REFERENCE TO RELATED APPLICATIONS

This application claims the benefit of priority based on German Application No. 199 57 549.5, filed 30, Nov. 1999, which is incorporated by reference herein in its entirety.

BACKGROUND OF THE INVENTION

The invention relates to an anti-theft protection system for a motor vehicle, and to a method for operating an anti-theft protection system. The system and the method allow access to (e.g., via a closure system), and use of (e.g., via an immobilizer), a motor vehicle only when authorization is verified.

It is believed that electronic, generally radio-based, closure systems are increasingly replacing conventional mechanical closure systems. It is believed that examples of such radio-based closure systems comprise a code transmitter (e.g., an electronic key, ID transmitter, or ID tag) and at least one transmitting and receiving unit in the motor vehicle. It is believed that examples of such code transmitter have a transponder that contains an electronic code, which is interrogated via radio transmission by one or more of the transmitting and receiving units.

It is believed that various non-contact types of transmission are currently in general use in motor vehicle technology. It is believed that examples of low-frequency systems, e.g., in the 125 kHz frequency band, transmit and receive signals via coils. It is also believed that there are high-frequency systems, e.g. at 433 MHz or 868 MHz.

It is believed that, in general, microwave systems or radar systems can be used for transmitting signals. It is believed that these signals can be modulated with a broad bandwidth such that range or distance can be measured using the radar principle. It is further believed that when using microwaves, distance measurements are essentially based on a radar signal being transmitted in the direction of the measurement object, being reflected by the object, and being received as a reflected signal after a delay time. It is believed that the distance to the object, or changes in that distance, can be deduced by evaluating the phase or time difference between the transmitted signal and the received signal. In addition to pulse delay-time measurement, it is believed that frequency-modulation (FM) or correlation methods can also be used for distance measurement. The general radar measurement principles are described, for example, in J. Detlevsen "Radartechnik" [Radar technology], Springer-Verlag, Berlin, 1989.

When such radio frequency (RF) transmission methods are used for transmitting remote-control signals to closure systems or anti-theft protection systems for motor vehicles, it is believed to be important to know the location of the code transmitter in order to satisfy all the security and convenience requirements. In particular, it is believed that knowing whether the code transmitter is located inside or outside the motor vehicle is important in terms of whether the doors are intended to be unlocked or the immobilizer disabled It is believed that one possibility for interior/exterior detection is evaluating the mean transmitted power of the radio signals. It is believed that this can be done quite well in low-frequency systems, but involves considerable complexity in terms of antenna design and antenna placement, and, frequently, special adaptations to different motor vehicle types. Also, the system becomes more complex in terms of the increased number of transmitting and receiving units, and in terms of the distance measurement accuracy that is required from these units.

SUMMARY OF THE INVENTION

An advantage of the present invention is providing an anti-theft protection system having internal/external discrimination with respect to a motor vehicle. In the motor vehicle, a transmitting and receiving unit can be used to transmit signals and then wait for echo signals. All the received echo signals can be supplied to an evaluation unit that uses profiles of the echo signals to determine the location of the code transmitter. Appropriate features of the motor vehicle, such as a central locking system or an immobilizer, can then be controlled accordingly.

The present invention provides an anti-theft protection system for a motor vehicle. The anti-theft protection system comprises a transmitting and receiving unit adapted to be arranged on the motor vehicle, a code transmitter adapted to be portable with respect to the motor vehicle, and an evaluation unit evaluating an echo signal to determine a position of the code transmitter from an echo profile of the echo signal. The code transmitter transmits the echo signal at least in response to receiving the transmitted signal.

The present invention also provide a method for operating an anti-theft protection system for a motor vehicle. The method comprises transmitting a transmitted signal from a transmitting and receiving unit adapted to be arranged on the motor vehicle, receiving an echo signal transmitted from a code transmitter adapted to be portable with respect to the motor vehicle, and evaluating the echo signals in an evaluation unit adapted to be arranged on the motor vehicle. The evaluating includes determining a position of the code transmitter based on an echo profile of the echo signal.

BRIEF DESCRIPTION OF THE DRAWINGS

The accompanying drawings, which are incorporated herein and constitute part of this specification, illustrate presently preferred embodiments of the invention, and, together with the general description given above and the detailed description given below, serve to explain features of the invention.

DETAILED DESCRIPTION OF THE PREFERRED EMBODIMENT

Figure 1:
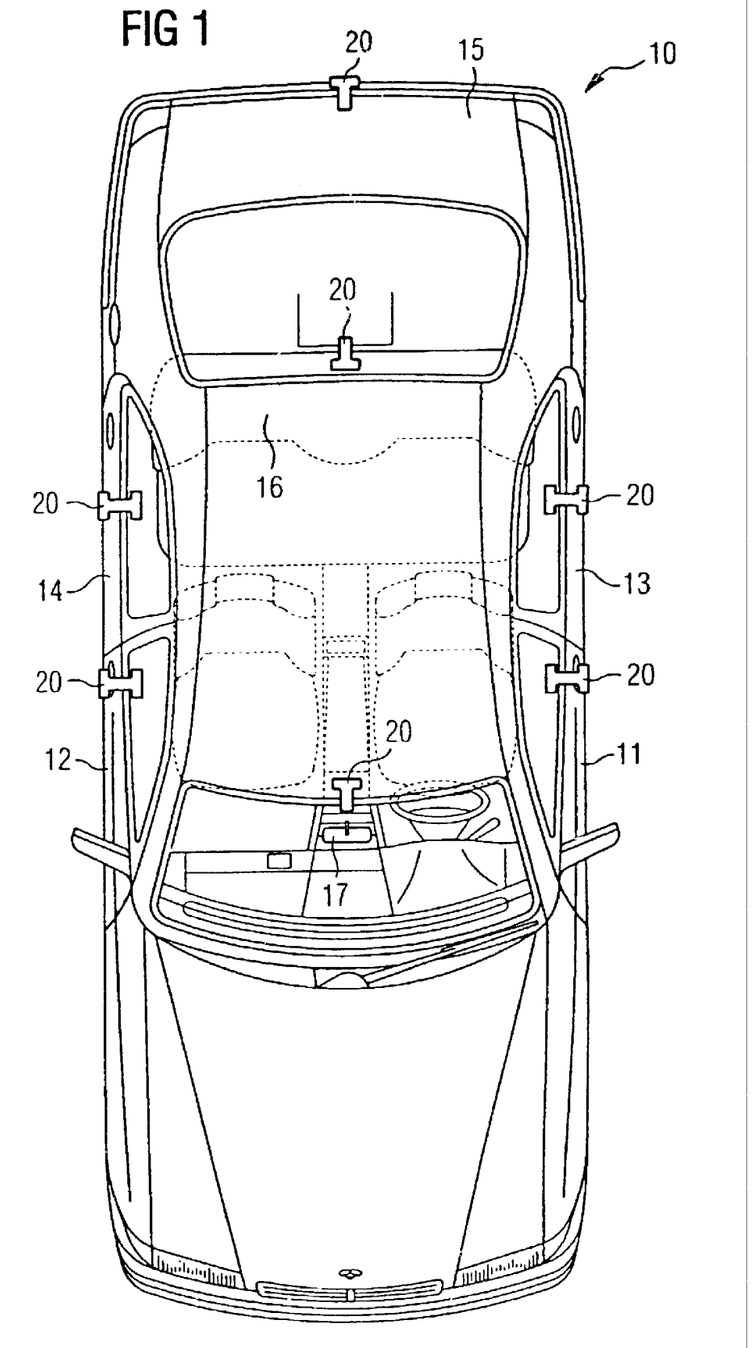
FIG. 1 shows an example of anti-theft protection system according to the invention. In this example, the anti-theft protection system is arranged with respect to a motor vehicle.
Figure 2:
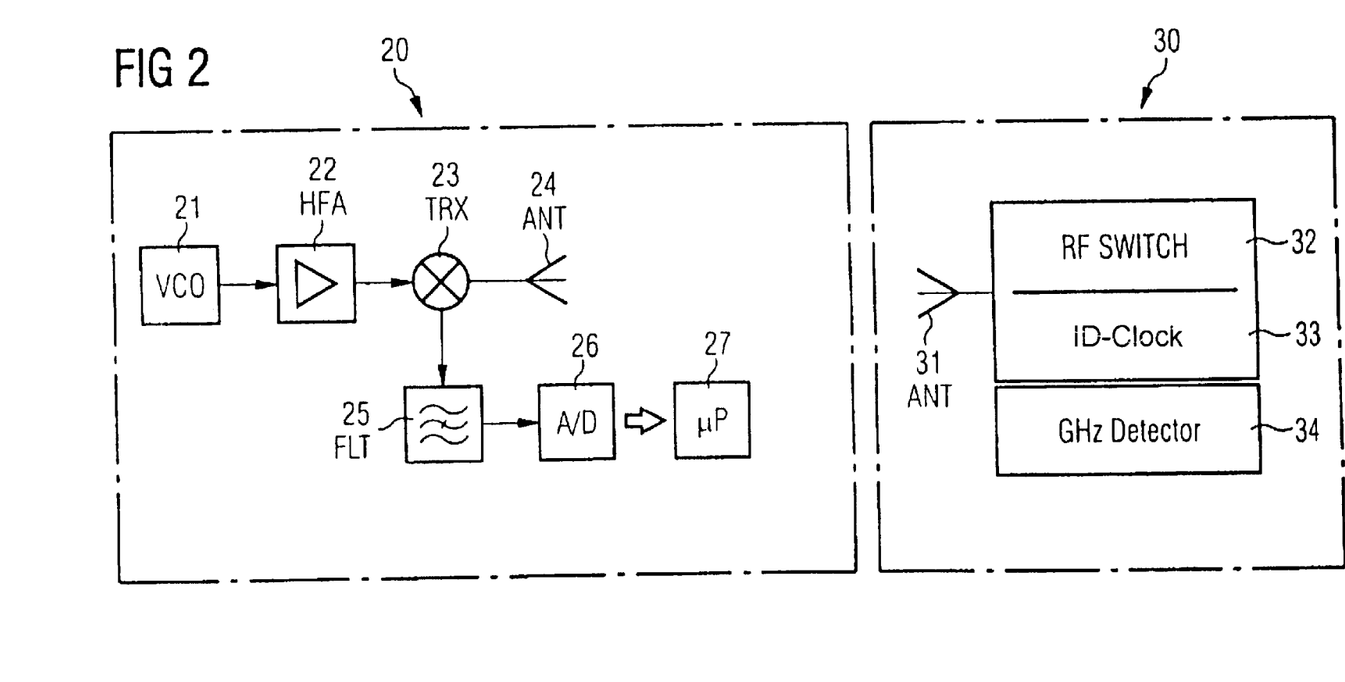
FIG. 2 shows a schematic diagram of the anti-theft protection system shown in FIG. 1.

Referring initially to FIGS. 1 and 2, an anti-theft protection system for a motor vehicle 10 has a transmitting and receiving unit 20, which is arranged in the vehicle 10, for example on the internal mirror/rear-view mirror 17. This transmitting and receiving unit 20 transmits signals as periodically required or continually, and then waits to receive reflected signals (referred to as echo signals in the following text).

The transmitted signals can be in the microwave band. These signals are partially or completely reflected by objects, or can be reflected more than once, on the way back to the receiving unit.

If a portable code transmitter 30 with a transponder is arranged in the effective range of the transmitting and receiving unit 20 (that is to say within range) and receives a transmitted signal, then it automatically sends back a modulated code signal (by means of an active reflector, which is also referred to as a "back scatterer" in the specialist jargon). The transmitted signal can be mixed with the reflected signals using frequency-modulated continuous-wave (FM-CW) methods to obtain a low-frequency measurement signal, e.g., an echo signal, that can have a profile such as those shown in FIGS. 3 and 4.

The modulation process in the code transmitter 30 results in the code signal being converted, for example, from baseband 41 to another frequency band (for example a sideband 42, 42'). These code signals, which are also in the microwave band, are received both on the direct path from the code transmitter 30 to the transmitting and receiving unit 20 and, in part, by the transmitting and receiving unit 20 after being reflected a number of times by objects.

Figure 3:
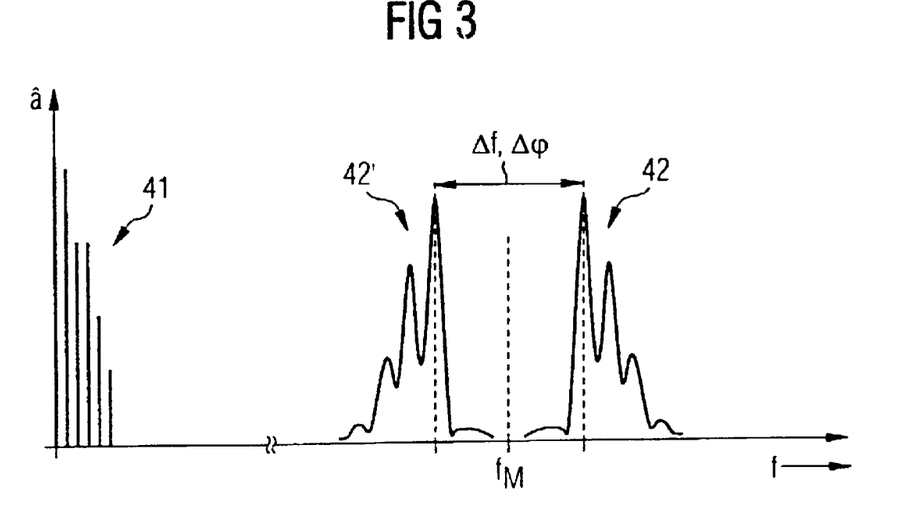
FIG. 3 shows a frequency spectrum of an echo signal measured by a receiving unit in the anti-theft protection system shown in FIG. 1.

FIG. 3 illustrates a frequency spectrum of echo signals that have been received as measurement signals (echo signals) and are mixed by the transmitting and receiving unit 20 using the known FM-CW radar principle. The envelope curve of all the amplitudes â of the echo signals over the entire frequency band, or at least a section of it, is referred to here as the echo profile, which is evaluated. Amplitude â, phases Φ, and the frequency f of the echo signals are thus measured and are further-processed in a computation unit.

The transmitting and receiving unit 20 can operate on the principle of the FM-CW method, which is known from radar technology. In this case, the transmitted frequency is varied within a predetermined frequency band (bandwidth). The distance to an object can be determined by measuring the frequency difference Δf or the phase difference ΔΦ between the transmitted frequency and the received frequency. The received frequency f or phase Φ are thus proportional to distance.

The first maximum (the closest to the modulation frequency $f_M$ in FIG. 3) of the upper sideband 42 is a direct echo signal from the code transmitter 30. The other maximums represent additional reflections on objects. Their delay time to the transmitting and receiving unit 20 is greater. They thus occur at higher frequencies.

The echo signals, which are reflected directly on objects such as the bodywork of the motor vehicle 10 or other objects located in the vicinity of the motor vehicle 10, occur in the frequency region around the mixing frequency 0 Hz (also referred to as baseband 41). The echo signals in baseband 41 are of less interest.

As a consequence of the frequency conversion by the modulation of the code transmitter 30, there are echo signals in the upper frequency band (corresponding to the two sidebands 42 and 42' when using double sideband modulation), and these are used as an echo profile (distribution of the echo signals over the frequency f and/or time t) for evaluation of the echo signals and for distance measurement. The modulation process (preferably frequency modulation) results in two sidebands 42 and 42', which are symmetrical with respect to the modulation frequency $f_M$ of the code transmitter 30. Since the echo signals transmitted by the code transmitter 30 are likewise partially reflected a number of times by objects, a number of maximum values are obtained above the frequency f, and their associated frequencies each represent a distance to an object. The echo profile of one sideband 42 or 42' is sufficient to carry out an evaluation process in an evaluation unit, such as a microprocessor 27.

In the evaluation unit, the echo profile is initially evaluated to determine the authorization of the code transmitter 30 (that is to say does the code signal match the expected code signal) and subsequently evaluated to determine the distance between the code transmitter 30 and the motor vehicle 10. If the code transmitter 30 is authorized and it is located within a predetermined range around the motor vehicle, then appropriate actions are controlled, such as unlocking or locking door locks, disabling or enabling the immobilizer, closing windows, unlocking or locking the trunk, unlocking or locking the tank filler cap, etc.

In order to satisfy security and convenience requirements, it is important to anti-theft protection systems for the location or the position of the code transmitter 30 to be known. In particular, the information relating to whether the code transmitter 30 is located inside or outside the motor vehicle 10 can be of critical importance. The present invention can prevent the driver from being inadvertently locked out of the motor vehicle 10 if the code transmitter 30 is left in the motor vehicle 10. Furthermore, a second code transmitter 30 that is located inside the motor vehicle 10 can be deactivated if the motor vehicle 10 has been locked correctly using a first code transmitter 30 that is located outside the motor vehicle 10.

According to the present invention, those without a valid code transmitter 30, e.g., children or unauthorized third parties, can be prevented from starting the motor vehicle 10 if the authorized party with a valid code transmitter 30 is still located in the vicinity of, but not within, the motor vehicle 10. Thus, according to the present invention, starting the motor vehicle 10 can be prevented unless there is a valid code transmitter 30 inside the motor vehicle 10.

The question as to whether a third party with a valid code transmitter 30 can be granted permission to start the motor vehicle in the same situation can be made possible, depending on a security or convenience policy.

Distance-measuring microwave systems that use echo profiles (such as those illustrated in FIGS. 3 and 4A to 4F) can be used to determine the position of the code transmitter 30, and thus to identify whether the code transmitter 30 is located inside or outside the motor vehicle 10. Echo profiles represent the strength (amplitude â) of the reflections of the transmitted signal as a function of a distance between an object and the transmitting and receiving unit 20. The maximums in such an echo profile may be associated with reflective objects or reflector arrangements, in which case the reflection characteristics of the objects can be determined from the form of the echo profile and the amplitude â of the maximum, and the object distance can be determined from the position of the maximum.

The determination of the maximums and their features (for example position, amplitude â and form) can be carried out either by analogue or digital circuits (threshold or peak-value detectors, comparators, counters, filters or the like) or in conjunction with digital recording of the echo profile by means of a computation unit. The determination of maximums and detection of signal profiles are sufficiently well known that they do not need to be described in any more detail here.

According to the illustrated exemplary embodiment, the transmitting and receiving unit 20 transmits transmitted signals. A code transmitter 30 acts as an active reflector (backscattering), which modulates received signals and sends them back again. The echo signals received by the transmitting and receiving unit 20 are thus reflections of the transmitted signals, signals received as modulated signals directly from the code transmitter 30 (free-space transmitter), or reflected code signals which have traveled back between the code transmitter 30 and the transmitting and receiving unit 20 by being reflected on other objects.

Direct reflections (i.e., signals transmitted from the transmitting and receiving unit 20 that are directly reflected back to the transmitting and receiving unit 20; see baseband 41 in FIG. 8) can be suppressed for the evaluation by means of suitable modulation of the code transmitter 30 as described, for example, in German patent application 199 46 161.9, which is incorporated in its entirety herein by reference. Since these echo signals occur in baseband 41, they are of less interest.

For position determination, it is sufficient to evaluate one of the two sidebands 42 or 42' from FIG. 3. Such a sideband 42 or 42' is illustrated by way of example as an echo profile in FIG. 4A, wherein it is assumed that there are no reflections by objects. In order to keep the illustration simple, any influences from additional modulation (in addition to the transmitter-end modulation on which the distance measurement is based) that would cause the echo profile to have a different appearance are regarded as having been compensated for. In principle, such compensation allows any radar or microwave distance measurement to be changed to such a profile, even if it relates to a modulated, active reflector.

The width $\delta_{ax}$ of the echo signal from the code transmitter 30 is inversely proportional to the bandwidth B of the transmitted signal. In the exemplary embodiment shown in FIG. 4A, there is a single maximum in the region at a distance of about 2 m. Since there are no other maximum, it follows that the code transmitter 30 is arranged at a distance approximately two meters away from the transmitting and receiving unit 20.

Figure 4A:
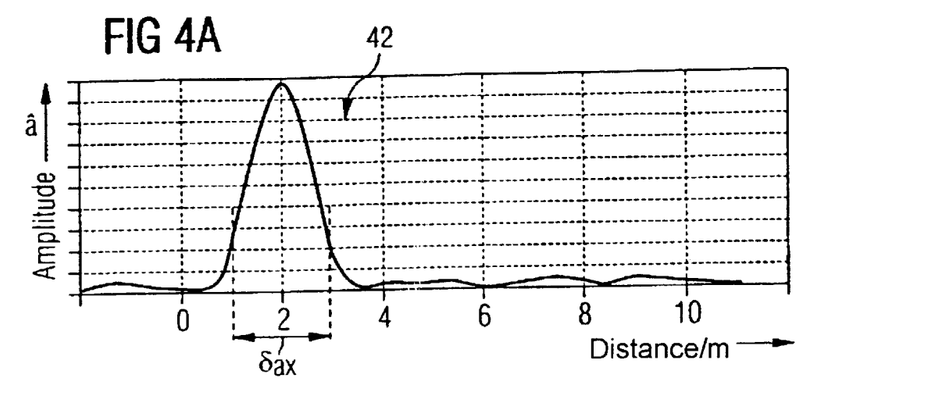
FIGS. 4A to 4F show received echo profiles for determining a position of a code transmitter.
Figure 4B:
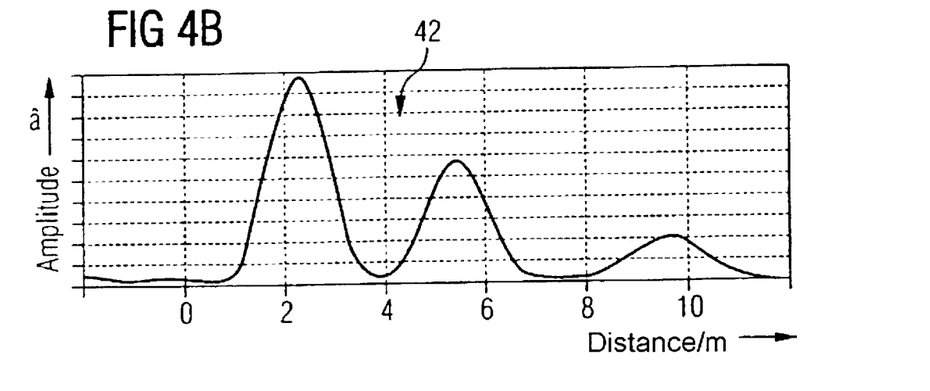
Figure 4C:
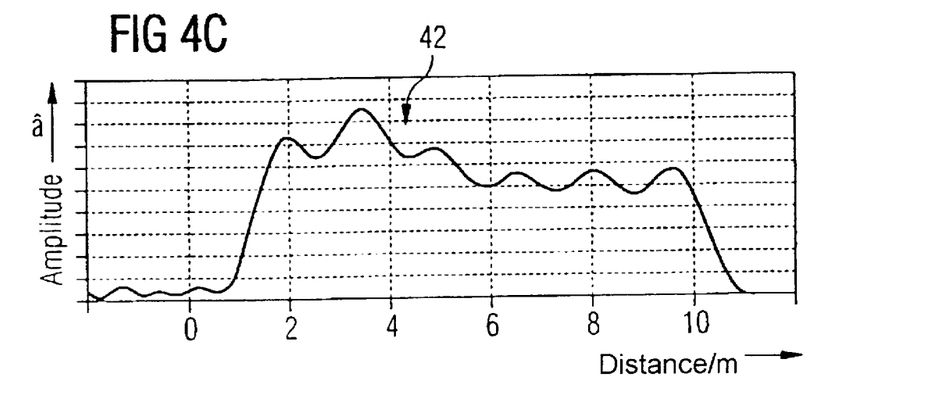

FIG. 4B shows an echo profile having the direct signal (maximum amplitude) from the code transmitter 30 (in this case, the code transmitter 30 is located at a distance somewhat greater than two meters) and two longer reflection paths (smaller amplitudes) that occur at distances of about 5.5 and 9.5 meters, and which correspond to objects on which the signals are reflected. FIG. 4C shows a similar situation except that, in this case, the direct transmission path between the code transmitter 30 and the transmitting and receiving unit 20 has been shadowed by an object, since there is no single pronounced maximum.

Figure 4D:
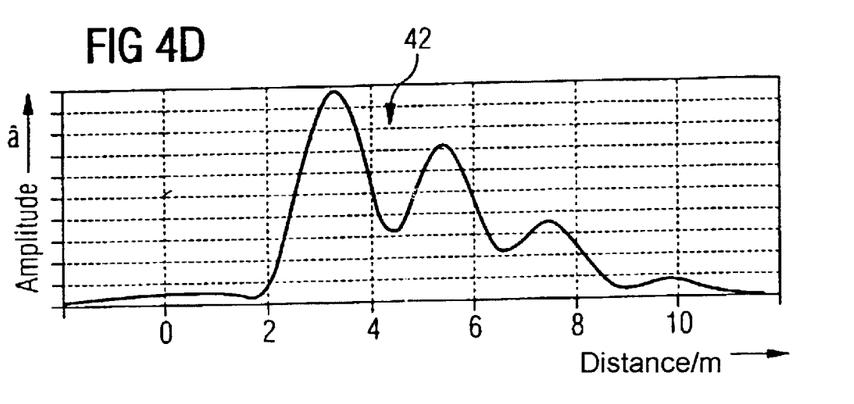

FIG. 4D shows a situation with a very large number of reflection paths that are located so close to one another in terms of distance that they can no longer be detected as individual, separate echoes, owing to the limited resolution, which is governed by the width $\delta_{ax}$ of an echo.

With reference to FIGS. 4A to 4D, the form of the echo profile is heavily dependent on the respective measurement situation and the environment. According to the present invention, this form of the echo profile is evaluated in order to decide whether the code transmitter 30 is located inside or outside the motor vehicle. This evaluation can be used on its own to make a decision as to whether the code transmitter 30 is located inside or outside the motor vehicle.

Alternatively, distance measurement methods that are based on distance measured values and/or the transmitted power can also be used to determine the position of the code transmitter 30.

Figure 4E:
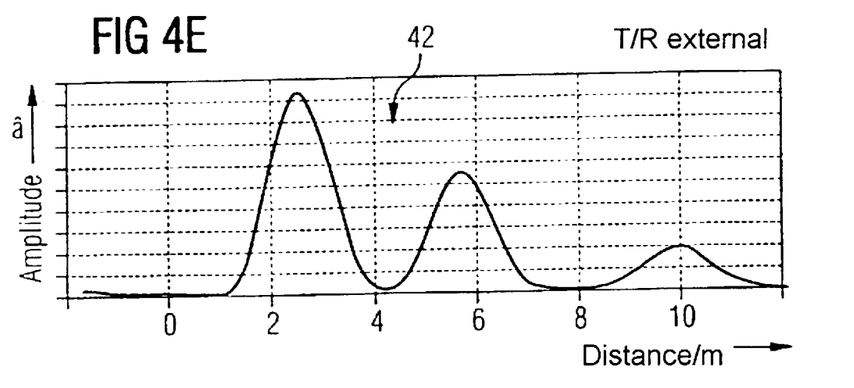
Figure 4F:
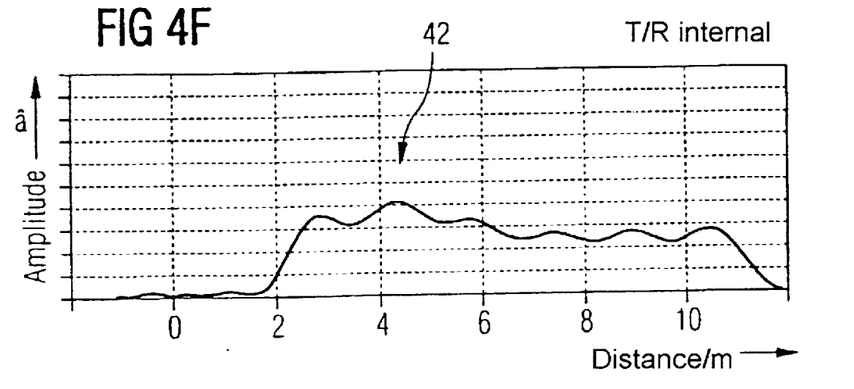
Figure 5A:
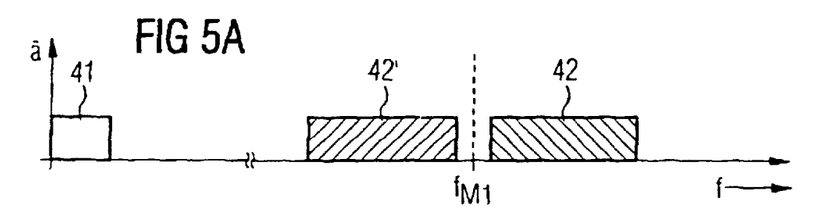
FIGS. 5A to 5D show frequency spectrums of the echo profiles for decoding the received echo signal.
Figure 5B:
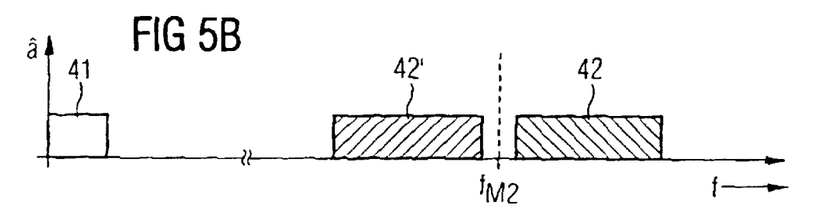
Figure 5C:
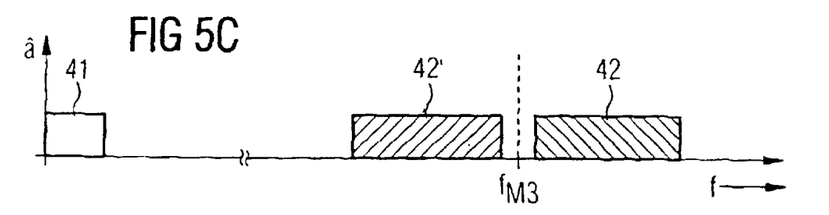
Figure 5D:
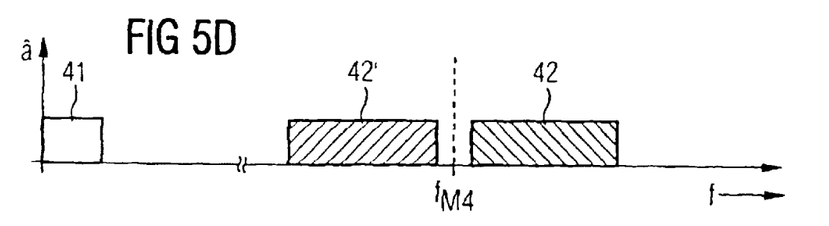

If a code transmitter 30 that is located in the passenger compartment of the motor vehicle 10 is interrogated by a transmitting and receiving unit 20, which is likewise located in the interior of the vehicle, then a characteristic feature is that numerous reflections occur on the internal walls and on the internal equipment (by way of example, the echo profile which is illustrated in FIGS. 4C and 4F). Such "internal echo profiles" have no pronounced or separate maximums, but a large number of amplitude peaks over the entire frequency band of interest, and thus also over the entire distance of interest, i.e., within which the code transmitter 30 is intended to be located in order to control units in the motor vehicle 10.

A characteristic feature in the echo profile shown in FIGS. 4C and 4F is that the amplitudes â of the echoes decrease, on average, only very slightly with distance, which can be explained by the fact that the interior of the vehicle is bounded by the bodywork on all four sides (at least in the lower part). Consequently, the majority of the microwave radiation is reflected backward and forward in the interior and is attenuated only slowly by absorption. The microwave radiation can escape directly only through non-reflective objects, such as windows or a sliding roof.

If, in contrast, the code transmitter 30 is located externally, that is to say outside the motor vehicle 10, then the signal transmission situation and thus the echo profile are generally very different (e.g., the echo profiles illustrated in FIGS. 4B and in 4F, which has the transmitting and receiving unit 20 located on the outside of the motor vehicle 10). As a rule, there are no close boundaries formed by reflective surfaces in this case. A substantially closed reflection area is not produced even if a number of vehicles are parked close to one another. In consequence, there are no pronounced maximums. Normally, the echo profiles outside the vehicle thus correspond in terms of their type to those illustrated in FIG. 4A, 4B or 4F. Thus, typically, there are far fewer reflections and, as a rule, the echoes from longer distances are also received with considerable attenuation.

The determination, according to the invention, of the position of the code transmitter 30 and thus the decision as to whether the code transmitter 30 is located inside or outside the motor vehicle are carried out in such a way that the measured echo profiles are classified on the basis of their form (for example in FIG. 4A, 4B or 4E, the code transmitter 30 is decided to be located externally; and in FIGS. 4C, 4D and 4F: the code transmitter 30 is decided to be located internally).

There are a large number of options available for this type of classification. One option is, for example, to measure the amplitudes â of the echo profile at a number of points and to pass these values, or values derived from these values, to a neural network which has already been trained using a large number of exemplary data items, in order to distinguish between echo profiles with the code transmitter 30 inside the motor vehicle and outside the motor vehicle. The output of the neural network produces the decision as to whether the input data represents an echo profile from the interior or from the exterior.

In order to improve the classification result, the training data could be obtained separately, and used for training purposes, for various motor vehicles or interior types. The neural network could also be trained using mixed measurement data from different typical motor vehicle interiors in order in this way to obtain good classification results on average for all vehicle types.

A further option is to extract features from the echo profiles and to use these features as input data for a classifier. Suitable features are the position of the maximum and magnitude of the amplitude â and form factors, as well as the width of the maximum. The classification of echo profiles is described in detail in U.S. Pat. No. 5,587,969, which is incorporated in its entirety herein by reference.

In addition to other methods, fuzzy algorithms can be used as classification methods. For the present invention, the rules would have to be adapted in accordance with the specific features, as described above, relating to the echo profiles. The classification rules result from the physical diffraction, scattering and reflection and transmission laws, which need to be applied to the respective measurement situation, or else from empirical values obtained from exemplary measurements.

Another way of determining whether the code transmitter 30 is located inside or outside the motor vehicle is obtained by the echo profile classification process according to the invention also being combined with a determination of position based on a triangulation measurement and/or evaluating the level of the mean transmitted power. However, in microwave systems, using the mean transmitted power to detect whether the code transmitter 30 is located inside or outside the motor vehicle is significantly less effective, since microwaves are reflected very strongly on objects inside and outside the motor vehicle 10, and the simple and known laws relating to propagation attenuation of electromagnetic waves in free space can no longer sensibly be used as the basis for power comparisons and power assessments.

If the echo profile form or the measurement bandwidth does not allow the maximum of the first echo to be detected reliably, then it makes sense to determine the distance of the echo using the shortest transmission path based on its left-hand rising edge, and to determine the physical position using the distance value obtained in this way. Even if it has to be assumed that the echo at the shortest distance in the echo profile has not been transmitted directly on the shortest route from the code transmitter 30 to the transmitting and receiving unit 20, the possibly incorrect position values can nevertheless be used to assist the classification process according to the invention with regard to the interior/exterior decision. The result of the overall measurement and of the subsequent classification process is a probability level that indicates the level of probability that the code transmitter 30 is located inside or outside the motor vehicle. The greater the number of reference patterns available to the neural network, the better is the accuracy of the statement.

A further improved way of determining whether the code transmitter 30 is located inside or outside the motor vehicle is achieved by evaluating the echo profiles from a number of transmitting and receiving units 20 jointly in the interior/exterior classification process. The classification process can once again be based directly on the sampled echo profiles or on features (amplitude â, frequency f, and width $\delta_{ax}$ of the maximum) of the echo profiles.

This will be explained with reference to the example of a measurement system shown in FIGS. 4E and 4F. In this case, it is assumed that two transmitting and receiving units 20 are distributed at different locations on the motor vehicle. One transmitting and receiving unit 20 can be arranged on the rear-view mirror 17 in the interior (corresponding to FIG. 4F; major measurement direction longitudinally through the entire width of the interior; this is thus referred to as an interior sensor) and one transmitting and receiving unit 20 is arranged in the decorative strip on the outside of the motor vehicle 10 (corresponding to FIG. 4E; major measurement direction the hemisphere away from the motor vehicle 10; this is thus referred to as an external sensor). Both transmitting and receiving units 20 interrogate the code transmitter 30, that is to say they each transmit a transmitted signal.

Each transmitting and receiving unit 20 receives a respective echo profile (FIGS. 4E and 4F), which are now evaluated. If the echo profiles are considered individually, then the echo profile from the external sensor shown in FIG. 4E makes it possible to deduce, using the classification method described above, that the code transmitter 30 is located externally, since separate and pronounced maximums are evident.

The echo profile for the internal sensor shown in FIG. 4F makes it evident, in contrast, that the code transmitter 30 is located inside the motor vehicle 10, since no pronounced maximums are evident.

If the amplitude values within the echo profiles and the distance range of the respective echo signals are compared, then it can be seen that the external echo profile shown in FIG. 4E assumes very high amplitude values at a considerably shorter distance. If one considers the point at which it is fitted and the polar diagram of the transmitting and receiving unit 20 located on the outside of the motor vehicle, then it is highly probable, on the basis of the physically possible or most plausible signal transmission rules, that the code transmitter 30 is located externally.

To distinguish reliably whether the code transmitter 30 is located inside or outside the motor vehicle, it is advantageous to store the measurement and evaluation results from previous measurements as a reference pattern in a memory, and to take them into account in the present measurements. Relevant variables can be, for example, position and amplitude changes, and changes relating to the highlights in the echo profile. In some cases, even simple averaging of measurement data or evaluation results leads to a considerable improvement in the measurement certainty. Particularly good results are achieved if a neural network is used for evaluation of the measurement results.

A classifier can be used to associate the echo signals with a position of the code transmitter 30 corresponding to an internal position or an external position. The classifier thus decides whether the code transmitter 30 is located internally or externally. The exact distance between the code transmitter 30 and the corresponding transmitting and receiving unit 20 does not need to be determined.

The transmitting and receiving unit 20 is preferably based on the use of microwave systems that operate at frequencies of 2.4 GHz, 5.8 GHz, 9.5 GHz, or 24 GHz. The advantage of such microwave systems is that they can be modulated with such a broad bandwidth that they are highly suitable for carrying out a distance measurement based on the radar principle.

In this case, the term broadband means that an oscillator frequency is varied and demodulated or modulated within a relatively wide frequency band during transmission or reception. This contrasts with typical modulation, in which modulation and demodulation are carried out at a fixed carrier frequency.

The transmitting and receiving unit 20 can also operate using other electromagnetic waves, such as optical waves.

Ultrasound signals may likewise be used as transmitted signals. All types of transmission are based on the physical diffraction, scattering and reflection and transmission laws, which need to be applied to the respective measurement situation.

FIG. 1 shows at least some possible locations for transmitting and receiving unit 20 in the motor vehicle 10. The transmitting and receiving units 20 are preferably located in at least one of the driver's door 11 or in the front seat passenger's door 12. The transmitting and receiving units 20 can each have two sensors, namely an exterior sensor and an interior sensor. If there are rear doors 13, 14, respective transmitting and receiving units 20 may likewise be arranged in each of them. Transmitting and receiving units 20 may also be arranged on the internal mirror 17, on the rear parcel shelf 16, and at the rear of the vehicle 10, in the vicinity of the trunk 15.

Each transmitting and receiving unit 20 transmits its transmitted signal in a preferred direction on request (for example by operating a switch or door handle on the motor vehicle 10), or when someone approaches the motor vehicle. These transmitted signals can be transmitted continually or intermittently. When the code transmitter 30 receives the transmitted signal, it sends back a code signal. The code signal and reflections of both the transmitted signal and of the code signal on objects result in the typical frequency profile (frequency spectrum) of the echo signal, which is received by the transmitting and receiving unit 20 and is evaluated in the evaluation unit.

FIG. 2 illustrates an exemplary embodiment of the construction of a transmitting and receiving unit 20 and of a code transmitter 30. The location and the number of transmitting and receiving units 20 depend on the vehicle geometry and the desired requirements with regard to the detection area in which the code transmitter 30 should be located, and with regard to the convenience in carrying the code transmitter 30. An advantage of assessing the echo profile is that the echo profile allows the requirements for distance measurement (measurement accuracy and the number of measurement points required) to be reduced considerably.

The radio-frequency modules in the transmitting and receiving unit 20 are designed, according to the second exemplary embodiment, such that they can supply echo profiles of the type described above. In this exemplary embodiment, the transmitting and receiving units 20 are designed on the basis of the known FM-CW radar principle. In this FM-CW method, a radar signal is transmitted which is frequency-modulated linearly or in steps (the transmission frequency is varied, while the reception frequency remains fixed). The transmitted signal is mixed with the received signal. It is believed that FM-CW is widely used and is thus sufficiently well known, e.g., in commercial radar transmitters, that it does not need to be described in any more detail here.

The transmitting and receiving unit 20 comprises a tunable-frequency oscillator 21 (VCO), a RF amplifier 22 (HFA), a transceiver 23 (TRX), an antenna 24 (ANT), a bandpass filter 25 (FLT) and a microprocessor 27 ($\mu$P), upstream of which an analogue/digital converter 26 (A/D) is connected. The microprocessor 27 provides an evaluation unit or classifier that evaluates the echo profiles and carries out the echo profile classification process described above. However, this can also be carried out in a central computer for a number of transmitting and receiving units 20.

The result of this classification and the determined distance of the code transmitter 30 and the amplitude â of the echo signal with the short delay time can be supplied to a central computer in the motor vehicle 10, which gathers and further-processes the data from all the transmitting and receiving units 20.

During the classification of the echo profile, the position of the code transmitter 30 relative to the vehicle is determined based on one or more distance measured values that are supplied by the transmitting and receiving units 20 that detect the code transmitter 30. This position value(s) and the classification results from the first echo profile classification, together with the amplitude values of the relevant echoes and results from previous measurements, are supplied to the central evaluation unit, which decides whether the code transmitter 30 is located inside or outside the motor vehicle 10. The distribution of the individual evaluation processes can, of course, also be distributed between one or more processors.

The central computer can also decide whether only the driver's door 11, the front seat passenger's door 12, all the doors 11–14, or only the trunk should be unlocked or locked. This depends on which of the transmitting and receiving units 20 that are distributed on the motor vehicle bodywork has reliably identified the position of the code transmitter 30. That is to say, the transmitting and receiving unit 20 from which the greatest amplitude â, or the shortest signal delay time between transmission of the transmitted signal and reception of the echo signal, is measured.

The code transmitter 30 has an antenna 31 (ANT) that is connected to a RF switch 32 and a dedicated clock 33 (ID clock) that is characteristic of the code transmitter 30. A radio-frequency detector 34 (GHz detector) can identify an interrogation signal that matches the code transmitter 30. The RF switch 32 then becomes active using a predetermined clock cycle (corresponding to the coding) that is characteristic of the code transmitter 30, and switches the antenna 31 such that an interrogation signal is reflected once and is then not reflected again.

The evaluation, according to the invention, of the echo profile allows interior and exterior identification to be carried out just by means of a single transmitting and receiving unit 20. Although most positions of the code transmitter 30 are then identified, there may be locations of the code transmitter 30 that cannot be correctly identified. For example, if it is located in a purse close to the floor and not in the main beam direction of the transmitting and receiving unit 20.

The entire interior of the vehicle and, at the same time, also large parts of the exterior can be "covered" by the radio-frequency transmitted signals by means of a single transmitting and receiving unit 20 that can be located on the internal mirror 17. Inside the motor vehicle, the transmitted signal is reflected backwards and forwards a number of times by the bodywork, and thus largely covers the passenger compartment. The windows do not act as reflectors, that is to say the transmitted signal generated inside the vehicle by the transmitting and receiving unit 20 can pass to the exterior. According to the present invention, it is possible to evaluate the echo signals using a single transmitting and receiving unit 20 to measure the distance between the code transmitter 30 and the transmitting and receiving unit 20.

The echo signal is also used to check the authorization for the code transmitter 30. Once the transmitting and receiving unit 20 has transmitted a microwave transmitted signal (using the FM-CW method), a code transmitter 30 that is located in the effective range of the transmitting and receiving unit 20 can receive this transmitted signal. The code transmitter 30 has a modulating reflector (for example an ultrasound wave filter or a surface acoustic wave filter) that modulates and sends back the transmitted signal, either directly or by being reflected from an object, as described above.

The modulation process is carried out using a code that is characteristic of the code transmitter 30 and is used as verification of access authorization to the motor vehicle 10. The code signal sent back is received and preprocessed by the transmitting and receiving unit 20, and is evaluated in the evaluation unit.

The modulation, demodulation and decoding processes will be explained with reference to FIGS. 3 and 5A to 5D. The transmitting and receiving unit 20 transmits a radio frequency transmitted signal. If the code transmitter 30 is addressed by the transmitted signal, then the amplitude â of the transmitted signal can be modulated at the modulation frequency $f_M$ (provided that frequency modulation is being used).

The interrogation signal received by the code transmitter 30 can be frequency modulated in the code transmitter 30, for example by a simple frequency shift, such that the echo signal that is sent back from the active reflector to the transmitting and receiving unit 20 is frequency-modulated. Consequently, the useful signal is transferred at least into one sideband 42, 42'. The transmitting and receiving unit 20 can separate the echo signal which is emitted from the active reflector from the interference signals in the baseband 41, for example by bandpass filtering the signal received by the transmitting and receiving unit 20.

The filtering or demodulation process can be carried out, for example, using an electronic circuit or algorithmically in a processor. An advantage is that interference influences are reduced and a long range can be achieved. Furthermore, it is flexible and comparatively economical.

FIG. 3 shows the entire frequency spectrum of all the echo signals received by the transmitting and receiving unit 20. In order to check the authorization, the reflections on other objects are ignored (this corresponds to the frequency lines in baseband 41 (on the extreme left in FIG. 3). In this case, the only frequencies that are considered are those located around the modulation frequency $f_M$ (that is to say in the two sidebands 42 and 42' that are a consequence of double sideband modulation).

The frequency interval $\Delta f$ and the phase interval $\Delta \Phi$ between the two sidebands 42 and 42' are proportional to the distance to the code transmitter 30. The mean value for symmetrical sidebands 42 and 42' gives the modulation frequency $f_M$, which can be calculated at the demodulator end by averaging. Data can be transmitted in modulated form by varying the modulation frequency $f_M$ in accordance with a predetermined algorithm in the code transmitter 30. FIGS. 5A to 5D illustrate frequency spectra with four different modulation frequencies $f_{M1}$ to $f_{M4}$. These correspond to four different "bits" of the code signal. If the change in the modulation frequency $f_M$ matches a change that is expected by the evaluation unit, then the code transmitter 30 is authorized.

In this way, an eight-bit "word" can be transmitted per measurement process at modulation frequencies, for example in the band from 30 kHz to 55.6 kHz, subdivided into 100 Hz steps. This corresponds to a 256-value code word (256 different code options).

The modulator of the code transmitter 30 may be an amplifier that amplifies the radio frequency transmitted signal in the active reflector. Such an amplitude amplification results in the echo signal sent back from the active reflector to the transmitting and receiving unit 20 having a much larger amplitude a than that of interference signals. This allows interference signals to be suppressed, and allows the measurement range to be increased in a similar way to a passive reflector. However, in contrast to a passive reflector, the magnitude of the gain is largely independent of the area of the reflector and, furthermore, can be chosen as required.

It is advantageous for each code transmitter 30 (with its active reflector) to transmit using a modulation frequency $f_M$ that is characteristic of that particular code transmitter 30. This makes it possible to distinguish between and separate signals from a number of code transmitters 30. Thus, apart from the position determination described above, each code transmitter 30 can also be independently checked for its authorization. Furthermore, each code transmitter 30 may be assigned a priority number for determining the code transmitter 30 to which priority is to be given, and whose authorization is critical. Personal data relating to the motor vehicle can also be transmitted with the code signal and, when the authorization is verified, appropriate settings may be implemented in the motor vehicle, such as seat and mirror adjustment.

If the code transmitter 30 is located outside the motor vehicle 10, then a received and authorized echo signal results in all the doors and closures of the motor vehicle 10 being locked or unlocked. If the code transmitter 30 is located inside the motor vehicle 10, and the echo signal is authorized, a vehicle immobilizer can be disabled. According to the present invention, it is also possible to disable the immobilizer only in combination with an additional action, e.g., if the driver is operating a start switch or operating other switching elements, such as the brake pedal or shift lever.

The code transmitter 30 may be in the form of a smart card or a conventional mechanical key. The code transmitter 30 can take any form so long as the echo signals with their echo profile are used to trigger an enable signal as a function of (1) the distance of the code transmitter 30 from the vehicle, and (2) authorization of a code signal.

While the present invention has been disclosed with reference to certain preferred embodiments, numerous modifications, alterations, and changes to the described embodiments are possible without departing from the sphere and scope of the present invention, as defined in the appended claims. Accordingly, it is intended that the present invention not be limited to the described embodiments, but that it have the fall scope defined by the language of the following claims, and equivalents thereof.

What is claimed is:

1. An anti-theft protection system for a motor vehicle, the anti-theft protection system comprising:

a transmitting and receiving unit adapted to be arranged on the motor vehicle, the transmitting and receiving unit transmitting a transmitted signal with several carrier frequencies modulated within a frequency band;

a code transmitter adapted to be portable with respect to the motor vehicle, the code transmitter transmitting a coded and modulated echo signal at least in response to receiving the transmitted signal; and an evaluation unit evaluating the echo signal to determine a position of the code transmitter based on at least one of the carrier frequencies reflected in an echo profile of the echo signal and determining authorization of the code transmitter by demodulating and decoding the echo signal.

2. The anti-theft protection system as claimed in claim 1, wherein the transmitting and receiving unit is adapted to be arranged on at least one of an internal mirror and one or more doors of the motor vehicle.

3. The anti-theft protection system as claimed in claim 1, further comprising:
- a plurality of the transmitting and receiving units adapted to be distributed on the motor vehicle, each of the plurality of the transmitting and receiving units transmit the transmitted signal and receive the echo signal; and
- wherein the evaluation unit evaluates the echo signal received by each of the plurality of the transmitting and receiving units to determine the distance between the code transmitter and the transmitting and receiving unit.

4. The anti-theft protection system as claimed in claim 1, wherein the evaluation unit comprises a memory storing echo profiles as reference patterns.

5. The anti-theft protection system as claimed in claim 1, wherein the evaluation unit comprises a neural network evaluating the echo profiles.

6. The anti-theft system of claim 1, wherein the position of the code transmitter to the transmitting and receiving unit is measured using an amplitude of at least one of the carrier frequencies.

7. The anti-theft system of claim 1, wherein the position of the code transmitter to the transmitting and receiving unit is measured using a phase of at least one of the carrier frequencies.

8. The anti-theft system of claim 1, wherein the position of the code transmitter to the transmitting and receiving unit is measured using a frequency difference of at least one of the carrier frequencies.

9. A method for operating an anti-theft protection system for a motor vehicle, the method comprising:
- transmitting a broadband modulated transmitted signal from a transmitting and receiving unit adapted to be arranged on the motor vehicle;
- receiving a coded and modulated echo signal transmitted from a code transmitter adapted to be portable with respect to the motor vehicle; and
- evaluating the echo signals in an evaluation unit adapted to be arranged on the motor vehicle, the evaluating including determining a position of the code transmitter based on a reflected frequency in an echo profile of the echo signal and determining authorization of the code transmitter by demodulating and decoding the echo signal.

10. The method as claimed in claim 9, wherein a plurality of the transmitting and receiving units are adapted to be distributed on the motor vehicle, and wherein the transmitting comprises a respective plurality of the transmitted signals and the evaluating comprises a plurality of the echo signals.

11. The method as claimed in claim 9, further comprising:
- associating the echo signals with the position of the code transmitter being one or internal with respect to the motor vehicle and external with respect to the motor vehicle.

12. The method as claimed in claim 9, wherein the transmitting comprises at least one of a microwave signal and a radar signal being transmitted at a frequency greater than 1 GHz.

13. The method of claim 9, wherein the position of the code transmitter to the transmitting and receiving unit is measured using an amplitude of the reflected frequency.

14. The method of claim 9, wherein the position of the code transmitter to the transmitting and receiving unit is measured using a phase of the reflected frequency.

15. The method of claim 9, wherein the position of the code transmitter to the transmitting and receiving unit is measured using a frequency difference of the reflected frequency.

* * * * *